G. P. TAYLOR.
TRUCK.
APPLICATION FILED JULY 1, 1911.
1,122,439.
Patented Dec. 29, 1914.
2 SHEETS—SHEET 1.
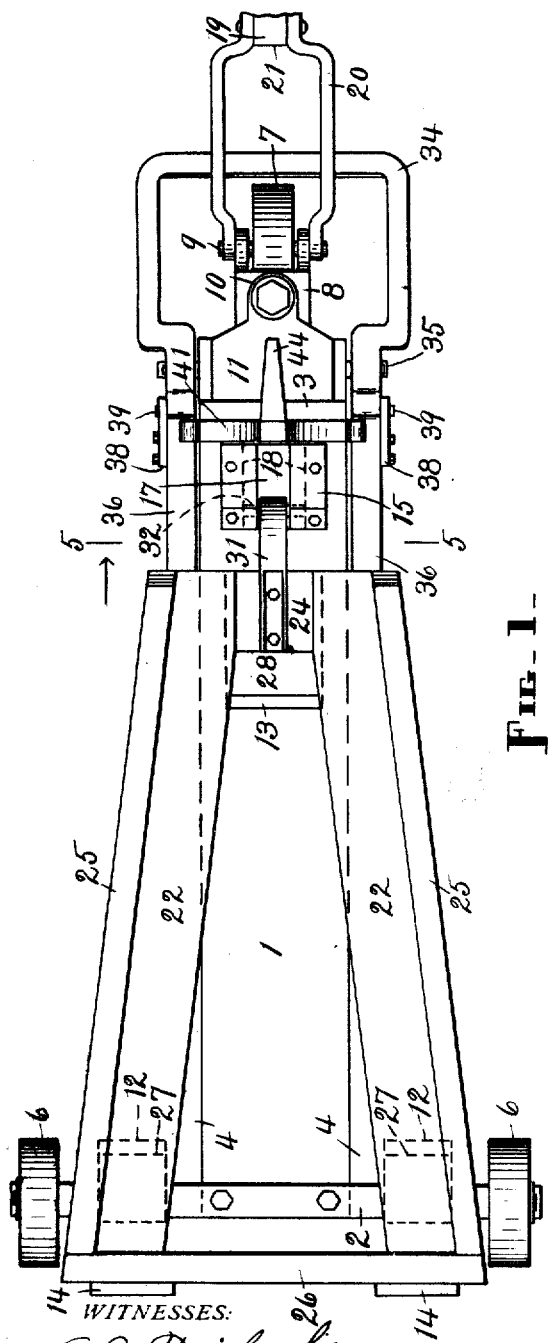
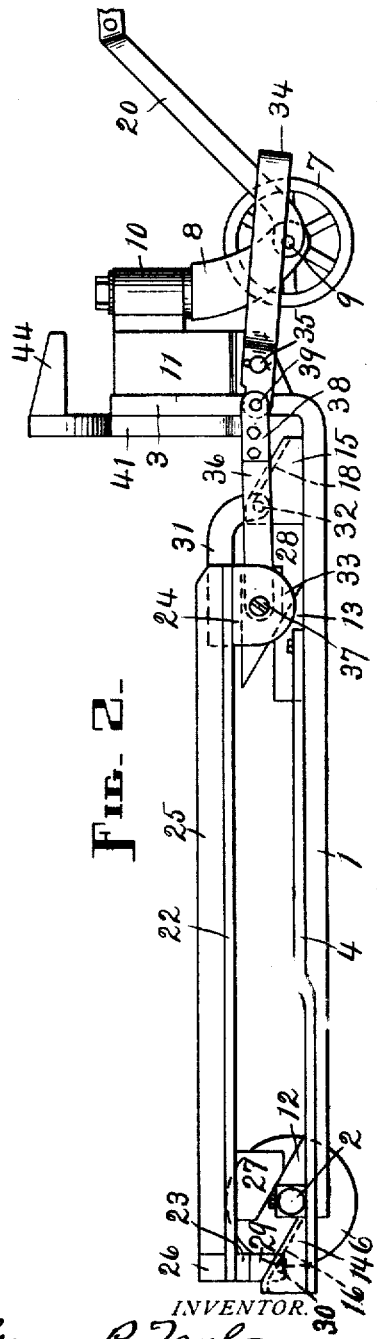
WITNESSES:
A. C. Fairbanks
J. M. Davenport
INVENTOR.
George P. Taylor
BY
Webster & Co.
ATTORNEYS.

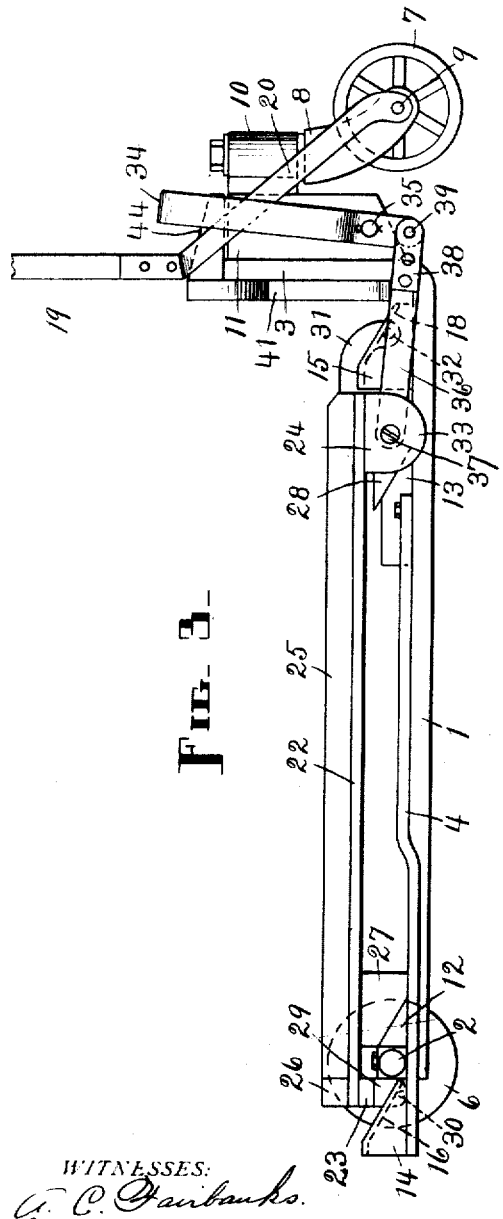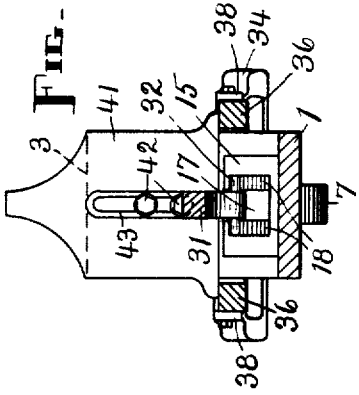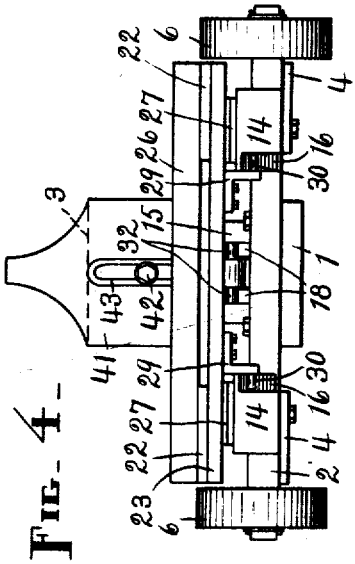

UNITED STATES PATENT OFFICE.

GEORGE P. TAYLOR, OF HOLYOKE, MASSACHUSETTS, ASSIGNOR, BY MESNE ASSIGNMENTS, TO HERBERT W. COWAN, J. LEWIS WYCKOFF, AND EDWARD N. WHITE, TRUSTEES, DOING BUSINESS AS COWAN TRUCK COMPANY.

TRUCK.

1,122,439.  Specification of Letters Patent.  Patented Dec. 29, 1914.

Application filed July 1, 1911. Serial No. 636,400.

*To all whom it may concern:*

Be it known that I, GEORGE P. TAYLOR, a citizen of the United States of America, residing at Holyoke, in the county of Hampden and State of Massachusetts, have invented a new and useful Truck, of which the following is a specification.

My invention relates to improvements in trucks, and more especially to hand trucks such as are used in factories, warehouses, stores, and other places to haul goods or materials from one point to another, and preferably but not necessarily to such trucks in which the construction is of a nature to convert a horizontal movement into a vertical movement, and said invention resides particularly in certain peculiar means or mechanism operated by the handle or tongue of the truck for operating in turn or moving the upper truck section in relation to the lower truck section, or vice versa, as hereinafter set forth.

The objects of my invention are, first, to produce an elevating truck for use in raising goods or material from the support therefor or with such support from the floor, hauling the same to any desired place, and there depositing said goods or material, whereby a large saving in time, labor and expense is effected; second, to produce a truck of this kind and for this purpose which is comparatively simple both in construction and operation, light, and inexpensive, and at the same time strong and durable; third, to provide such a truck with powerful, quick-acting, operating means which is under the control of the handle or tongue of the truck and may be said to be automatically controlled by the latter, to the end that said truck is not only capable of handling a great weight, but of doing so with the expenditure of the minimum amount of exertion or effort on the part of the operator, and, fourth, to provide a truck which, while it has a sufficient range of elevation, is, nevertheless, so low that it can be operated in connection with a pile or stack of goods or material that is supported very close to the floor, this being a decided advantage because of the desirability of piling or stacking the goods or material without too much space between the bottom of the same and the floor.

Other objects will appear in the course of the following description.

A suitable embodiment of the invention is illustrated in the accompanying drawings, and I will proceed to describe the invention with reference to the same, although it is to be understood that the form, construction, arrangement, etc., of the parts in various aspects are not material and may be modified without departure from the spirit of the invention.

In the drawings, in which similar reference characters indicate corresponding parts throughout the several views, Figure 1 is a top plan of a truck which embodies the said invention; Fig. 2, a side elevation of such truck; Fig. 3, also a side elevation of said truck, but showing the upper truck section depressed and the operating mechanism disposed accordingly; Fig. 4, a rear end elevation of the truck, and, Fig. 5, a cross-section taken on lines 5—5, looking in the direction of the associated arrow, in Fig. 1.

The body of the truck shown as an embodiment of the invention consists of a central longitudinal bottom plate 1 having its rear end rigidly attached to the underside of an axle 2 and its forward terminal turned up as represented at 3, and two diverging braces 4 rigidly attached at their front ends to the top of said plate and at their back ends to the aforesaid underside of said axle, such braces being offset downwardly to permit this last attachment to be made. Two wheels 6 are mounted on the axle 2 and support the back end of the truck, and a third wheel 7 is provided to support the front end of said truck and for steering purposes, said last-mentioned wheel being mounted between the arms of a fork 8 on an axle 9 in the lower ends of the arms of said fork, which fork has its stem pivotally mounted vertically in a bearing 10 that extends forward from a bracket 11 secured against the front of the upstanding part 3 of the plate 1.

Fastened securely on the braces 4 immediately in front of the axle 2 are two wedge-blocks 12, and fastened securely on the plate 1 some little distance behind the part 3 and between the front ends of said braces is a third wedge-block 13. The inclined faces of the three wedge-blocks are toward the front, that is to say, each wedge-block has a face that slants downwardly and forwardly. Mounted in the same secure manner on the braces 4, behind the axle 2 and in line with the wedge-blocks 12, are two guide-blocks 14, while another guide-block 15 is similarly mounted on the plate 1 in advance of the wedge-block 13. Each guide-block 14 is provided with an inwardly-extending flange 16, Fig. 4, the underside of which flange has the same inclination as that of the wedge-blocks. The guide-block 15 has a central longitudinal slot 17 therein opening through the top thereof, and the sides of such slot are undercut to form flanges 18—18 having their undersides inclined like the undersides of the flanges 16.

A handle or tongue 19, only the inner terminal of which appears in the drawings, is provided for the truck, and this tongue has a forked terminal 20 which is pivotally mounted on the axle 9. This construction provides the tongue 19 with a shoulder 21, as shown in Fig. 1. Preferably the terminal 20 is arranged at an angle to tongue 19, as shown, so that the tongue 19 can be held conveniently in an approximately horizontal position while hauling the truck.

The platform of the truck shown as an embodiment of the invention consists of two diverging plates 22 rigidly connected at their rear ends to the top of a cross-piece 23, and at their front ends to the top of a cross-piece 24, and two side beams or rails 25 and a back beam or rail 26, the former being secured to said plates and the latter to said cross-piece 23 on top. The rails 25 and 26 are the members upon which the load is directly received. The plates 22 carry on their undersides two wedge-blocks 27 to coöperate with the wedge-blocks 12, and the cross-piece 24 carries on its underside a wedge-block 28 to coöperate with the wedge-block 13, said wedge-blocks 27 and 28 being in proper positions for such coöperation and having their working faces inclined upwardly and rearwardly. Two angular brackets 29 equipped with laterally extending pins 30 are secured to the underside of the cross-piece 23 in such a way that said pins extend beneath the flanges 16 of the guide-blocks 14. Secured to the top of the cross-piece 24 between the front terminals of the plates 22 is a lug 31 which projects forwardly and downwardly and has a pin 32 inserted in the free end thereof. The aforesaid free or front end of the lug 31 extends into and operates in the slot 17 of the guide-block 15, and the pin 32 projects laterally from said lug on both sides and beneath the flanges 18 of said guide-block. Each end of the cross-piece 24 is bent downwardly to form an ear 33.

The arrangement of parts in the illustrated embodiment of the invention is such that longitudinal movement of the platform must bring about either the raising or lowering of the same, according to the direction of such movement, owing to the presence of the interposed wedge-blocks, while said platform is held by the guide-blocks against lateral movement, by reason of the fact that the brackets 29 are between the rear guide-blocks and the lug 31 in the slot 17 in the forward guide-block; furthermore, the pins 30 and 32, which engage the flanges 16 and 18, follow up or down said flanges, as the case may be, and because said pins do thus engage the flanges they prevent the platform from tilting at either end. As already intimated, the pins 30 and 32 are always in engagement with the flanges 16 and 18, a condition due to the constant relation of said pins to the wedge-blocks 27 and 28 and the correspondence between all wedge-block bevels and the flange bevels.

Passing next to the illustrated operating mechanism for the platform, or for the body, as the case may be, it will be observed that a yoke 34, through which the tongue 19 or its fork 20 extends, is pivoted to the bracket 11 by means of a pin 35 which extends through such bracket from side to side, and that such yoke is connected by means of two links 36 with the platform. The rear end of each link 36 is pivoted at 37 to an ear 33, and the front end of such link, or in the present case an extension 38 rigidly attached thereto, is pivoted at 39 to one of the ends of the yoke 34 behind or below tne pin 35, according to the position of said yoke. As here represented, knuckle-joints are formed between the ends of the yoke 34, each of which ends extends a short distance beyond the pin 35, as just noted, and the contiguous ends of the links 36, that is to say, such ends of the yoke are let in to such ends of the links, for the purpose of stiffening or strengthening the construction.

A flat plunger 41 is mounted for vertical movement on two bolts 42 which pass through a vertical slot 43 in said plunger into the part 3. This plunger rests on the links 36 behind the pivots 39, and its movement is limited by the slot 43. Projecting forward from the top of the plunger 41 is a dog 44 which is in the path of the shoulder 21. The dog 44 has a downwardly and forwardly slanting top surface.

The plunger 41 is forced down by the action of the shoulder 21 on the dog 44, when the tongue 19 is swung upward or backward on the axle 9 into the position shown in Fig. 3, and in descending forces the pivotally-connected ends of the links 36 and yoke 34 downward. said links rocking on the pivots 37 and said yoke swinging on the pin 39, with the result that the platform is drawn into its forward and low position, with the wedge-blocks 27 and 28 resting on the braces 4 and plate 1, respectively, and said yoke is thrown upward into the position shown in said view, this movement on the part of the yoke on the pivot 35 being responsible for the advance movement of said platform. When the tongue 19, which is now resting on the dog 44, is thrown forward again, its terminal 20 encounters the yoke 34 and carries said yoke over into an approximately horizontal position, a very powerful leverage being thus produced owing to the peculiar construction of the parts, and said yoke in changing position forces back the links 36 and with them the platform which at the same time rises on the wedge-blocks and through the medium of the wedge-blocks. The links 36 are not only moved rearwardly by this action of the yoke, but they also swing upwardly at their front ends with the ends of said yoke, such upward movement being limited by the plunger 41 which is elevated by said links until the bottom of the slot 43 encounters the bottom bolt 42, when further movement of the parts ceases. The movement is sufficient to locate the pivots 39 slightly above an imaginary plane connecting the pivots 37 and 35, so that the platform is locked in its backward, elevated position by the links, yoke and plunger. The members are thus disposed as illustrated in Figs. 1, 2, 4 and 5.

It will be seen that the members 34, 35, 36, 37, 38 and 39 provide toggle means for operating the platform of the truck and for locking the same in raised position. When the member 34 is depressed it forces the member 38 rearwardly until the pivot 35 has been forced beyond a line extending directly between pivots 35 and 37. The construction will then act as a toggle lock, because the member 36 cannot move up any farther. The specific toggle operating means and lock is claimed herein as novel, and it is also desired to cover the full mechanical equivalent of the means described.

Any load which the truck is adapted to handle can be raised and lowered with ease and celerity by this mechanism.

The pile of goods or material to be handled with my truck is supported from the floor at a sufficient height to enable said truck to be run under the same when the platform is depressed, and usually benches unattached to the floor are provided to support such goods or material, such benches being raised, transported, and set down again with the goods or material on them during the entire operation.

Briefly, the operation of the illustrated truck as a whole is described as follows: The truck, with the tongue 19 down as a rule, is hauled to the vicinity of the load to be moved and backed up to the same, then said tongue is thrown upward and backward to lower the platform, through the medium of the plunger 41, links 36 and yoke 34, and the wedge-blocks, and the truck is backed beneath the load, entering between the side supports for said load, the same being the side supports of the bench when the latter is used. Next the tongue 19 is forced downward and forward to raise the load, which includes the bench when present, from the floor on or with the platform, through the medium of the yoke and links and the wedge-blocks. The load is now hauled to the desired locality and there deposited by once more throwing up the tongue to lower the platform and permit the bench to descend onto the floor, or the load without the bench, in the absence of the latter, to descend onto other supporting means. It is obvious that in lowering the platform its movement is controlled by the operator who uses the tongue to press backward against and resist the upward pressure of the upwardly moving yoke which is forced against the tongue by the weight of the load. Of course in this form of the invention, this braking action of the tongue or handle may be effectuated immediately after the breaking of the toggle by rapidly moving the tongue forwardly until it meets the yoke, which is rising under the weight of the load, and it cannot be used in taking up the pressure of the yoke during its complete rise, but only for a part of its rise, unless the foot of the operator presses the yoke back. In the better form of the invention which is to form the subject of a separate application, the tongue may be used as described during the complete rise of the yoke, for the purpose of braking the upward pressure of the yoke. Finally the truck is drawn from beneath the load and out of the way.

It will be observed that when the parts are in the position shown in Fig. 2, that is, with the platform raised and locked, the handle may be raised, thus disengaging it from the toggle portion 34, and can then be freely moved to the right and left or up and down, without engaging or unlocking the toggle. This permits the manipulation of the steering wheel and of the handle freely in the ordinary operation of wheeling and steering the truck after the platform has been raised.

When the mechanism is operated to elevate the load and the rails 25 come into contact with the under surface of the load, there is, obviously, so much frictional resistance that the truck platform is held stationary while the truck body moves forward on the wheels 6 and 7, but the result is the same, that is, the platform is elevated and carries the load up with it.

This truck, whether loaded or unloaded, is drawn about on its wheels by the tongue in the same manner as any truck.

Obviously this invention is susceptible of various modifications, and although but one form is illustrated and described, the claims are so drawn that parts may be omitted, parts added, and parts substituted by others, without departing from the scope and spirit of the present invention.

What I claim as my invention, and desire to secure by Letters Patent, is—

1. A truck provided with a handle or tongue and comprising the combination with the latter of an upwardly movable platform, a toggle having operative connection with said platform and operable by said handle, adapted to be maintained in position to lock said platform in raised position by the load imposed on said platform, and a movable toggle stop operable by said handle, said handle being independent of said stop.

2. A truck, comprising the combination of a base, a platform movable upwardly from said base, a handle or tongue, on one of said parts, a toggle connected with said base and platform and adapted to be maintained in position to lock said platform in raised position by the load imposed on said platform, and means for acting on said toggle to unlock said platform, said means being operable at will by said handle, and said handle being independent of said means.

3. A truck provided with a handle and comprising an upwardly movable platform, a toggle having operative connection with said platform, adapted to be maintained in position to lock said platform in raised position by the load imposed on said platform, and to be actuated to permit the lowering of said platform, and separate members operable by said handle for operating said toggle.

4. A truck, comprising an upwardly movable platform and a toggle having operative connection with said platform, adapted to be maintained in position to lock said platform in raised position by the load imposed on said platform, and to be actuated to permit the lowering of said platform, and means for operating said toggle comprising a handle, and members between which said handle is free to move, one of said members being movable toward said handle through the operation of the other member by said handle.

5. A truck, comprising the combination of a base having wheels at the rear and a wheel swiveled at the front, a handle connected with said wheel for steering the truck, a platform movable up and down, and means operated by said handle for raising and locking said platform, so that the load holds said means locked, said handle being movable independently of said means and adapted to operate thereon at will and being also free to be moved laterally of said means.

6. A truck, comprising the combination of an upwardly movable platform, a handle, an upright swivel connecting said handle with the truck, and means operable by said handle for raising said platform, said handle being free to be moved upon said swivel laterally of said means but being at any time free to operate on said means at will.

7. In a truck, the combination of a base, a platform movable upwardly, means for guiding said platform upwardly, a link pivotally connected with said platform, means pivoted to said base and having an end extending beyond its pivot, toward said link, said latter extended end being pivoted to the forward end of said link to provide a toggle, and means for actuating said pivoted means to raise said platform.

8. In a truck, the combination of a base, having an upstanding member at the front end, a platform, means for guiding said platform upwardly and downwardly, and means for moving said platform downwardly, comprising a handle or tongue provided with a shoulder, means for pivotally connecting the handle or tongue with the base, links pivotally connected with said platform and said base, and a rising and falling plunger mounted on said upstanding member above said links and provided with a member located in the path of said shoulder when said handle is swung backward.

9. The combination, in a truck, with a suitable body and a suitable superimposed platform arranged for relative horizontal movement, means to convert such movement into a vertical movement, and guide means for said platform at the ends to prevent it from tilting, such guide means being independent of said first-mentioned means, of a handle or tongue for the truck, and means operated by said handle or tongue to produce the aforesaid horizontal movement.

10. The combination, in a truck, of upper and under sections arranged for relative horizontal movement, coacting wedge-blocks attached to said sections; flanged guide-blocks attached to one of such sections, the guide-block flanges being inclined, and members carried by the other of said sections to engage said flanges.

11. The combination, in a truck, with a suitable body and a suitable superimposed platform arranged for relative horizontal movement, and means to convert such movement into a vertical movement, of mechanism for actuating said platform or said body, as the case may be, such mechanism comprising a tongue pivotally connected with said body, a yoke pivotally connected with said body in the path of said tongue, links pivotally connecting said platform with said yoke, and a movable member in operative relation to said links and also in the path of said tongue.

12. The combination, in a truck, with a suitable body and a suitable superimposed platform arranged for relative horizontal movement, such body having an upstanding member at the front end, and means to convert said movement into a vertical movement, of a tongue pivotally connected with said body and provided with a shoulder, a yoke pivotally connected with said body in the path of said tongue when swung forward, links pivotally connecting said platform with said yoke, and a rising and falling plunger mounted on said upstanding member above said links and provided with a member located in the path of said shoulder when said tongue is swung backward.

13. The combination, in a truck, with a suitable body and a suitable superimposed platform arranged for relative horizontal movement, such body having an upstanding member at the front end, and means to convert such movement into a vertical movement, of a tongue pivotally connected with said body and provided with a shoulder, a yoke pivotally connected with said body in the path of said tongue when swung forward, links pivotally connecting said platform with said yoke, a rising and falling plunger mounted on said upstanding member above said links and provided with a member located in the path of said shoulder when said tongue is swung backward, and means to limit the movement of said plunger.

14. The combination, in a truck, with a suitable body and a suitable superimposed platform arranged for relative horizontal movement, such body having an upstanding member at the front end, and means to convert such movement into a vertical movement, of a yoke pivotally connected with said upstanding member of said body, links pivotally connecting said platform with said yoke, and means to stop the pivotally-connected parts of said links and yoke in their upward movement after the axis of the same has passed the plane common to the axial connections between said body and yoke and between said platform and links.

15. A truck comprising the combination of a base, a platform movable upwardly from said base, a handle or tongue on one of said parts, a toggle connected with said base and platform and adapted to be maintained in position to lock said platform in raised position by the load imposed on said platform, and means for acting on said toggle between its toggle joint and one of its ends to break the toggle and to unlock said platform.

16. A truck provided with a handle and comprising an upwardly movable platform, a toggle having operative connection with said platform, adapted to be maintained in position to lock said platform in raised position by the load imposed on said platform, and to be actuated to permit the lowering of said platform, and separate members for operating said toggle, one of said members being operable by said handle to raise said platform and the other acting on said toggle between its toggle joint and one of its ends to break the toggle and to unlock said platform for permitting it to lower.

17. A truck, comprising the combination of a base, a platform carried by and movable up and down on said base, a handle pivoted to swing up and down, means adapted to move said platform through the movement of said handle comprising a member pivoted to the base, and a link connected to the platform and pivoted to said member at a distance from the pivot of said member, said member and link adapted to be moved by the depression of said handle and said member extending across and in front of said handle when said handle is raised and the platform is lowered.

18. A truck, comprising the combination of a base having a wheel at the rear and a wheel swiveled at the front, a handle connected with said front wheel for steering the truck, a platform movable up and down, a handle-operated member pivoted to the base, a link connected with the platform and pivoted to said member at a distance from the pivot of said member, said member and link operable by said handle constituting a part of the means for raising said platform, and said member extending across and in front of said handle when said handle is raised and the platform is lowered.

19. A truck, comprising the combination of a base, a platform carried by and movable up and down on said base, a wheel support swiveled to said base, a handle pivoted to swing up and down on said support, means adapted to move said platform through the movement of said handle on said support and comprising a U-shaped member pivoted to opposite sides of said base, and links having pivot connections at their inner ends to opposite sides of said platform and their outer ends being pivoted to opposite arms of said member at a distance away from the pivots of said member, said pivots at the outer ends of said links adapted to be moved to opposite sides of an imaginary straight line connecting the pivots at the inner ends of said links and said member pivots, said member and links adapted to be moved by the depression of said handle, and the said member extending across and in front of said handle when said handle is raised and the platform is lowered.

20. The combination, in a truck, with a suitable body and a suitable superimposed platform arranged for relative horizontal movement, such body having an upright at its front end, and means to convert such movement into a vertical movement, of links pivotally connected with each other and with said upright and said platform, a tongue, pivotal connections between said body and said tongue, the latter being arranged when swung downward and forward to swing said links upwardly, and means to stop the pivotally-connected parts of said links in their upward movement after the axis of the same has passed the plane common to the axial connections between said links and said upright and platform.

21. The combination, in a truck with a suitable body and a suitable superimposed platform arranged for relative horizontal movement, such body having an upright at its front end, and means to convert such movement into a vertical movement, of links pivotally connected with each other and with said upright and with said platform, a tongue, pivotal connections between said body and tongue, the latter being arranged when swung downward and forward to swing said links upwardly, means to stop the pivotally-connected parts of said links in their upward movement after the axis of the same has passed the plane common to the axial connections between said links and said upright and platform, and means operated by said tongue when swung upward and backward to force said axis below said plane and release said links.

22. In a truck in combination, a main frame, a movable platform carried thereby, movable inclined members located between said frame and platform to move the latter upward, toggle mechanism adapted to move said members, a handle adapted to engage and move said toggle mechanism to a position such that the load holds said toggle locked, said handle being pivoted independently of said toggle whereby said handle is then disengageable from said toggle mechanism and movable up and down without engaging said toggle mechanism.

23. In a truck in combination, a main frame, a movable platform carried thereby, movable members located between said frame and platform to move the latter upward, toggle mechanism adapted to move said members, a handle adapted to engage and move said toggle mechanism to a position such that the load holds said toggle locked, said handle being pivoted independently of said toggle mechanism whereby said handle is then disengageable from said toggle mechanism and movable up and down without unlocking said toggle, one link and the center pivot of said toggle being located forward of said platform when said platform is in its lowered position.

24. In a truck in combination, a main frame, a movable platform carried thereby, movable inclined members, located between said frame and platform to move the latter upwardly, toggle mechanism adapted to move said members, a handle adapted to engage and move said toggle mechanism to a position such that the load holds said toggle locked, said handle being pivoted independently of said toggle on a universal joint whereby said handle is then disengageable from said toggle mechanism and movable up and down and to the right and left without engaging said toggle mechanisms, and a steering wheel movable to the right and left by said handle.

25. In a truck in combination, a main frame, a movable platform carried thereby, a handle movable up and down, actuating means between the frame and the platform adapted to move the platform upwardly and hold it and said actuating means locked, comprising a part engageable by the handle when the handle is in raised position and moved by the handle into a locked position such that the handle is disengageable from said part and movable away from the same as the handle is raised, whereby said handle may be then moved up and down without engaging said part, said handle being also pivoted so that it may be swung from side to side without moving said truck.

26. In a truck in combination, a main frame, a platform movable forward and back longitudinally of said truck, inclined members between said frame and platform to convert said longitudinal movement into a vertical movement, a handle pivoted to the frame and adapted to be moved up and down, toggle mechanism connected at one end with the frame and at the other end with the platform and adapted to be moved by the handle when it is lowered from its raised position and thereby move the toggle and platform to the locked position, said handle being then disengageable from connection with said toggle and movable up and down without unlocking said toggle.

27. In a truck, the combination of a base, a movable platform, a movable handle or tongue on said base, inclined members between said base and platform providing means for carrying the latter in a horizontal position, a toggle connected with said base and platform independently of the handle, the end pivots of said toggle being located one in advance of the other and the intermediate pivot being movable either above or below a direct line extending through said end pivots, a yoke in front of said handle, connected with said toggle and operated on by said handle to throw the toggle to locking position, whereby through the coöperation of said toggle and inclined members the said platform is moved away from the base and locked, and means for acting on said toggle to unlock said platform.

28. In a truck, the combination of a base, a movable platform, means for supporting said platform on said base and for causing it to move upwardly relatively to the base, a movable handle or tongue on said base, power multiplying means pivotally connected at the ends with said base and platform and operable by said handle, the said connecting pivots of which multiplying means being located one in advance of the other, a yoke in front of said handle, connected with said power multiplying means and operated on by said handle to move said multiplying means to a locking position, said handle being independent of said power multiplying means and yoke, and means for acting on said power multiplying means to unlock said platform.

29. In a truck, the combination of a base, a movable platform, a handle or tongue on one of said parts, inclined members between both ends of said base and platform providing carrying means for the latter, a toggle connected with said base and platform independently of the handle, the end pivots of said toggle being located one in advance of the other, and the intermediate pivot being movable either above or below a direct line extending through said end pivots, means operated on by said handle to throw the toggle to locking position, whereby through the coöperation of said toggle and inclined members one of said parts, that is the base and platform, is shifted horizontally relatively to the other and the platform carried upwardly in a substantially horizontal position and locked, and means for acting on said toggle to unlock said platform.

30. In a truck, the combination of a base, a movable platform, means at both ends of said platform for supporting it on said base and for causing one of the same to move into a horizontally shifted and vertically spaced position relatively to the other, a handle or tongue on one of said parts, that is the base and platform, power multiplying means pivotally connected at the ends with said base and platform and operable by said handle, the said pivots of which power means being located one in advance of the other, whereby one of said members, that is the base and platform, may be shifted in said horizontal direction so that said carrying means will act to elevate said platform, said handle being independent of said power means, and means for acting on said power means to unlock said platform.

31. In a truck, in combination, a main frame, a platform movable forward and back, inclined members between said frame and platform to convert said longitudinal movement into a vertical movement, a handle pivoted to the frame and adapted to be moved up and down, toggle mechanism connected at one end with the frame and at the other end with the platform and having a portion located on each side of the handle and adapted to be moved by the handle when it is lowered from its raised position and thereby move the toggle and platform to the locked position, said handle being then disengageable from connection with said toggle and movable up and down without unlocking said toggle.

32. In a truck, in combination, a main frame, a handle movable up and down, a platform carried by the frame and movable up and down, means to move said platform upwardly comprising a toggle having two links pivoted together in advance of said platform and also pivoted to said frame, said handle arranged to act on said means to move said toggle and platform to locked position, said handle being then disengageable from said means and movable up and down and to the right and left without engaging said means.

GEORGE P. TAYLOR.

Witnesses:
F. A. CUTTER,
A. C. FAIRBANKS.

It is hereby certified that in Letters Patent No. 1,122,439, granted December 29 1914, upon the application of George P. Taylor, of Holyoke, Massachusetts, for an improvement in "Trucks," an error appears in the printed specification requiring correction as follows: Page 6, strike out lines 98–110 and insert the following: *a vertical movement, a handle pivoted to the frame and adapted to be moved up and down, toggle mechanism connected at one end with the frame and at the other end with the platform and adapted to be moved by the handle when it is lowered from its raised position and thereby move the toggle and platform to the locked position, said handle being then disengageable from connection with said toggle and movable up and down without unlocking said toggle.*

*27. In a truck, the combination of a base, a movable platform, a movable handle or;* and that the said Letters Patent should be read with this correction therein that the same may conform to the record of the case in the Patent Office.

Signed and sealed this 19th day of January, A. D., 1915.

[SEAL.]

R. F. WHITEHEAD,
*Acting Commissioner of Patents.*